G. E. MITTINGER, Jr.
COFFEE PERCOLATOR.
APPLICATION FILED AUG. 3, 1908.
941,330.
Patented Nov. 23, 1909.
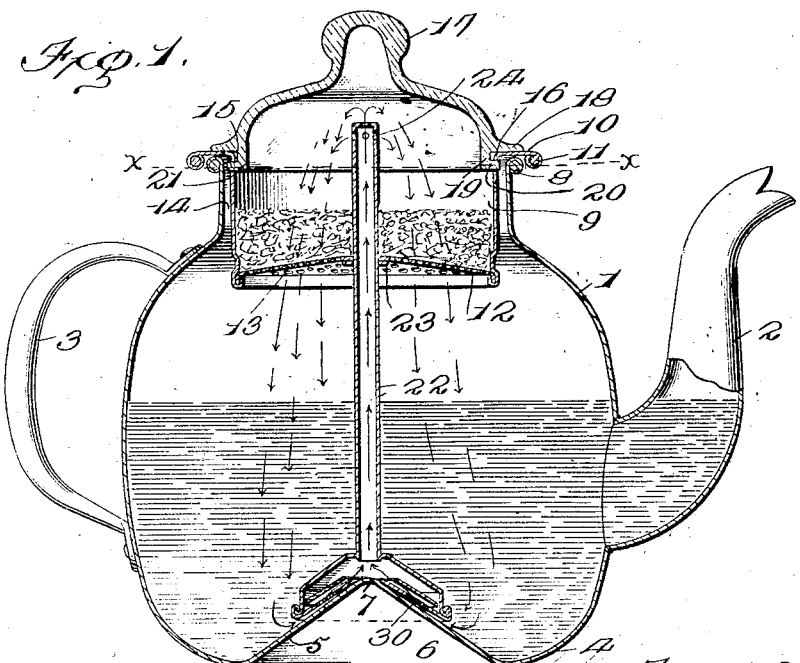
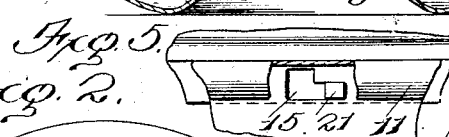
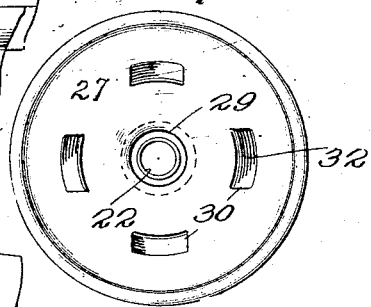
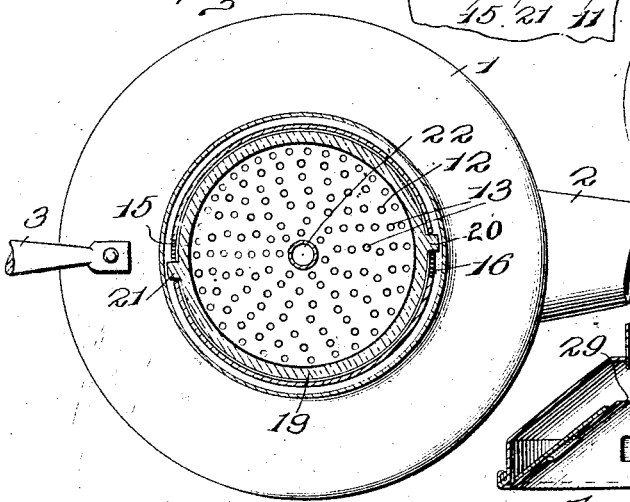
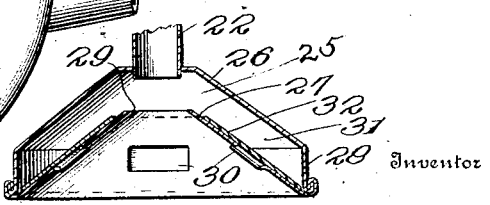
Witnesses
Inventor
George E. Mittinger, Jr.
By
Attorney

UNITED STATES PATENT OFFICE.

GEORGE E. MITTINGER, JR., OF NEW CASTLE, PENNSYLVANIA.

COFFEE-PERCOLATOR.

941,330.  Specification of Letters Patent.  Patented Nov. 23, 1909.

Application filed August 3, 1908. Serial No. 446,724.

*To all whom it may concern:*

Be it known that I, GEORGE E. MITTINGER, Jr., a citizen of the United States of America, residing at New Castle, in the county of Lawrence and State of Pennsylvania, have invented certain new and useful Improvements in Coffee-Percolators, of which the following is a specification, reference being had therein to the accompanying drawing.

My invention relates to improvements in coffee percolators.

The object of my invention is to provide a coffee percolator in which the heat applied is concentrated directly underneath the valve, which causes the valve to work more rapidly and start much more quickly than when the heat is distributed throughout the entire bottom of the pot.

Another object of my invention is to provide a more simple, cheap and effective device to accomplish the desired results.

In the accompanying drawings, Figure 1 is a vertical, sectional view of a coffee pot embodying my invention. Fig. 2 is a horizontal, sectional view taken on the line $x$—$x$ of Fig. 1. Fig. 3 is an enlarged botttom plan view of the valve seat and valve. Fig. 4 is an enlarged vertical, sectional view of the valve seat and valve. Fig. 5 is an enlarged detail view of the bayonet slot connection between the basket and the cover.

Referring now to the drawings, 1 represents the coffee pot which may be of any desired form but preferably of that shown in the drawings, having the spout 2 and the oppositely arranged handle 3, all of which might be varied as desired. The bottom 4 of the pot is drawn upwardly as indicated at 5 into a cone shaped member, having the cone shaped space 6 at the center of the bottom of the pot, in which the heat is concentrated by the shape thereof to the apex 7 or approximately so, for the purpose hereinafter more fully set forth. The heat as will be clearly shown, engages the lower faces of the cone and travels upwardly and concentrates itself at the apex thereof.

The pot is provided with the usual mouth, having the rolled portion 8 forming a support for the coffee basket. This basket as indicated at 9, is formed of a size slightly smaller than the mouth of the pot and adapted to enter the same and supported wholly within the pot. The basket as shown is made of metal and has its upper edge turned outwardly at right angles to the body portion and forming an annular flange 10 having its outer end rolled as indicated at 11 to strengthen the flange and also to form a finished edge.

The lower end of the basket has crimped or soldered therein the bottom 12 which is in the form of a sieve and concaved or bowed upwardly as shown, to form a stronger bottom to prevent the sieve from sagging. This sieve is preferably made of a sheet of metal having very small perforations therein, but which could be made of any desired gauze if desired, but is preferably of the form shown.

The body of the basket as shown, is a slight distance from the mouth of the pot, having the space 14 surrounding the same. Adjacent the upper end on opposite sides, the basket is provided with the bayonet slots 15 and 16. The cover 17 is preferably made of glass, in order that anyone may readily see when the percolator is in operation, and is of an oval form for the purpose hereinafter more fully set forth. The cover is provided with an outwardly extending flange 18, resting upon the annular flange of the basket. The vertical wall 19 of the cover extending within the basket, is provided with lugs 20 and 21 which enter the bayonet slots 15 and 16 and whereby the cover is locked upon the basket and the basket being loosely or removably mounted within the pot, it will be seen that the basket can be removed with the cover.

Carried by the center of the bottom 12 is a tube 22 which extends up above the upper end of the basket into the cover 17. The tube has a washer 23 soldered thereon and by means of which the bottom of the basket may be more rigidly secured to the tube. The upper end of the tube is closed and is provided with a series of small openings 24 through which the water passes, all of which will be hereinafter more fully described.

The lower end of the tube 22 has secured thereto the cone shaped member 25 which as shown is composed of two plates 26 and 27 spaced a distance apart and the upper plate 26 has its outer lower end turned downwardly at 28 and crimped to the lower plate 27. The upper end of plate 26 is soldered or otherwise secured to the tube 22. The plate 27 has an open upper end 29 which is closed by the upper end 7 of the cone bottom of the coffee pot. The plates 26 and 27 are parallel and are set at a different angle to the cone bottom of the pot, in order that there be a slight space between the cone bottom of the pot and the plate 27 to allow the water to pass under said plate. The plate 27 is provided with a series of openings 30 through which the water passes to a space between the plates 26 and 27 as will be hereinafter more fully described. Within the space 31 is the valve 32 which is of a cone shaped form and resting flat upon the lower plate 27 and closing the openings 30. The valve 32 and also the plates and the tube are preferably made of copper well tinned as copper is a better conductor of heat and therefore will percolate more quickly.

In operation the device is inserted in the pot as shown with the flange 10 of the basket supported upon the upper edge of the pot and the cone bottom closing the opening 29 in the plate 27. The pot 1 is then partially filled with water and the basket is filled or partially filled with coffee, and the lid then placed and locked upon the basket. The pot then being placed upon the fire, it will be seen that the heat is concentrated directly below the chamber 25 and will quickly heat, causing the water to pass under the plate 27 and raise the valve 32 and pass upwardly through the openings 30 and out through the tube 22 and is discharged upon the coffee and percolates down through the same into the water and makes the desired consistency of coffee. The valve 32 vibrates, thus causing the water to leave the ends of the tube 22 in spurts and the glass cover 17 allows seeing the device work, in order to determine when the proper amount of heat is applied.

By the construction herein set forth, it will be seen that the whole device is secured to the cover and can be removed therewith, whereby the cone-shaped pocket and the tube 22 can be readily cleaned through the opening 29.

Having thus fully described my invention, what is claimed as new, is:—

1. A coffee percolator, comprising a receptacle having an upwardly extending cone-shaped bottom, a basket supported within the receptacle, a tube extending downwardly through the basket, a cone-shaped pocket carried by the lower end of the tube and the lower wall of the pocket being conical and of an angle differing from the angle of said bottom and said wall having a central opening directly below the tube and into which the apex of the cone-shaped bottom extends, and said wall having a series of openings surrounding the central opening.

2. A coffee percolator, comprising a receptacle having an upwardly extending cone-shaped bottom, a basket supported within the receptacle, a tube extending downwardly through the basket, a cone-shaped pocket carried by the lower end of the tube and the lower wall of the pocket being conical and of an angle differing from the angle of said bottom, and said wall having a central opening directly below the tube and into which the apex of the cone-shaped bottom extends, and said wall having a series of openings surrounding the central opening, and a circular conical valve within the pocket and resting upon the conical bottom wall of the pocket and having a central opening whereby the series of openings are normally closed by the valve.

3. A coffee percolator comprising a receptacle having an upwardly extending cone-shaped bottom, a basket within the upper end of the receptacle, a tube extending downwardly through the basket adjacent the cone-shaped bottom, a cone-shaped pocket carried by the lower end of the tube and of an angle differing from the angle of said bottom, the lower wall having a cut-away central portion directly below the tube and into which the apex of the cone-shaped bottom extends, the lower wall of the cone-shaped pocket having a series of openings therein and a circular valve within the pocket and normally closing said openings.

In testimony whereof I affix my signature in presence of two witnesses.

GEORGE E. MITTINGER, Jr.

Witnesses:
C. H. JOHNSON,
THOS. H. HARTMAN.